(12) United States Patent
Sallese et al.

(10) Patent No.: US 11,301,170 B2
(45) Date of Patent: Apr. 12, 2022

(54) PERFORMING SUB-LOGICAL PAGE WRITE OPERATIONS IN NON-VOLATILE RANDOM ACCESS MEMORY (NVRAM) USING PRE-POPULATED READ-MODIFY-WRITE (RMW) BUFFERS

(71) Applicant: International Business Machines Corporation, Armonk, NY (US)

(72) Inventors: Kevin E. Sallese, Plainfield, IL (US); Timothy Fisher, Cypress, TX (US); Andrew D. Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 16/810,629

(22) Filed: Mar. 5, 2020

(65) Prior Publication Data

US 2021/0278996 A1 Sep. 9, 2021

(51) Int. Cl.
*G06F 3/06* (2006.01)
(52) U.S. Cl.
CPC .......... *G06F 3/0659* (2013.01); *G06F 3/0604* (2013.01); *G06F 3/0679* (2013.01); *G06F 3/0689* (2013.01)

(58) Field of Classification Search
CPC .... G06F 3/0604; G06F 3/0656; G06F 3/0659; G06F 3/0679; G06F 3/0685; G06F 3/0688; G06F 3/0689
See application file for complete search history.

(56) References Cited

U.S. PATENT DOCUMENTS

| | | | | |
|---|---|---|---|---|
| 6,151,658 | A * | 11/2000 | Magro | G06F 5/06 711/110 |
| 2009/0094406 | A1 * | 4/2009 | Ashwood | G06F 13/404 711/103 |
| 2019/0042355 | A1 * | 2/2019 | Ptak | G06F 11/108 |
| 2019/0073133 | A1 * | 3/2019 | Jiang | G06F 3/068 |

* cited by examiner

*Primary Examiner* — Larry T Mackall
(74) *Attorney, Agent, or Firm* — Zilka-Kotab, P.C.

(57) ABSTRACT

A computer-implemented method, according to one embodiment, includes: receiving a sub-logical page read command for data stored in NVRAM at a first LBA, and creating a searchable entry which includes the first LBA. Data read from the NVRAM is also received, where the received data corresponds to a given LBA. In response to determining that the given LBA matches the first LBA of the searchable entry, a copy of the received data is stored in a buffer. Moreover, in response to determining that a received sub-logical page write command is for data stored in the NVRAM at the first LBA, the copy of the received data in the buffer is coalesced with data included in the sub-logical page write command to form a full-logical page write. Furthermore, instructions to perform the full-logical page write in the NVRAM are sent.

20 Claims, 10 Drawing Sheets

| Addr | Valid [1](42) | Read Comp Drop [1](41) | Read Pending [1](40) | Buff_State [8](39:31) | LBA [31](31:0) |
|---|---|---|---|---|---|
| 0 | | | | | |
| 1 | | | | | |
| ⋮ | ⋮ | ⋮ | ⋮ | ⋮ | ⋮ |
| n | | | | | |

PERFORMING SUB-LOGICAL PAGE WRITE OPERATIONS IN NON-VOLATILE RANDOM ACCESS MEMORY (NVRAM) USING PRE-POPULATED READ-MODIFY-WRITE (RMW) BUFFERS

BACKGROUND

The present invention relates to data storage systems, and more particularly, this invention relates to performing sub-logical page write operations in NVRAM using pre-populated buffers.

NVRAM is a type of random-access memory which retains information stored thereon even after the power supply is turned off, and includes a number of different forms. Using Flash memory as an example, the performance characteristics of conventional NAND Flash-based solid state drives (SSDs) are fundamentally different from those of traditional hard disk drives (HDDs). Data in conventional SSDs is typically organized in logical page sizes of 4, 8, or 16 kilobyte (KB) sizes. Moreover, page read operations in SSDs are typically one order of magnitude faster than write operations and latency neither depends on the current nor the previous location of operations.

However, in Flash-based SSDs, memory locations are erased in blocks prior to being written to. The size of an erase block unit is typically 256 pages and the erase operations take approximately one order of magnitude more time than a page program operation. Due to the intrinsic properties of NAND Flash, Flash-based SSDs write data out-of-place whereby a mapping table maps logical addresses of the written data to physical ones. This mapping table is typically referred to as the Logical-to-Physical Table (LPT).

As Flash-based memory cells exhibit read errors and/or failures due to wear or other reasons, additional redundancy may be used within memory pages as well as across memory chips. For instance, redundant array of independent disks (RAID) such as RAID-5 and RAID-6 schemes may be implemented. The additional redundancy within memory pages may include error correction code (ECC) which, for example, may include BCH codes. While the addition of ECC in pages is relatively straightforward, the organization of memory blocks into RAID-like stripes is more complex. For instance, individual blocks are retired over time which requires either reorganization of the stripes, or capacity reduction of the stripe. As the organization of stripes together with the logical-to-physical table (LPT) defines the placement of data, SSDs typically utilize a Log-Structured Array (LSA) architecture, which combines these two methods.

The LSA architecture relies on out-of-place writes. In this approach, a memory page overwrite will result in writing the memory page data to a new location in memory, marking the old copy of the memory page data as invalid, and then updating the mapping information. Due to the limitations of current NAND memory technology, an invalidated data location cannot be reused until the entire block it belongs to has been erased. Before erasing, though, the block undergoes garbage collection, whereby any valid data in the block is relocated to a new block. Garbage collection of a block is typically deferred for as long as possible to maximize the amount of invalidated data in block, and thus reduce the number of valid pages that are relocated, as relocating data causes additional write operations, and thereby increases write amplification.

SUMMARY

A computer-implemented method, according to one embodiment, includes: receiving a sub-logical page read command for data stored in NVRAM at a first logical block address (LBA), and creating a searchable entry which includes the first LBA. Data that has been read from the NVRAM is also received, where the received data corresponds to a given LBA. In response to determining that the given LBA matches the first LBA of the searchable entry, a copy of the received data is stored in a buffer. A sub-logical page write command for data stored in the NVRAM is received, and in response to determining that the sub-logical page write command is for data stored in the NVRAM at the first LBA, the copy of the received data in the buffer is coalesced with data included in the sub-logical page write command to form a full-logical page write. Furthermore, one or more instructions to perform the full-logical page write in the NVRAM are sent.

A computer program product, according to another embodiment, includes a computer readable storage medium having program instructions embodied therewith. The program instructions are readable and/or executable by a processor to cause the processor to: perform the foregoing method.

A system, according to yet another embodiment, includes: a plurality of NVRAM blocks configured to store data, a processor, and logic that is integrated with and/or executable by the processor. Moreover, the logic is configured to: receive, by the processor, a sub-logical page read command for data stored in the NVRAM at a first LBA. The sub-logical page read command includes a hint and/or flag which indicates a RAID controller is a source of the sub-logical page read command. A searchable entry, which includes the first LBA, is created by the processor in a portion of memory which only includes entries that correspond to read commands issued by the RAID controller. Data that has been read from the NVRAM is also received by the processor, and in some approaches, the received data corresponds to a given LBA that matches a LBA of an entry in the portion of memory. Thus, in response to determining that the given LBA matches the first LBA of the searchable entry, a copy of the received data in a buffer is stored by the processor. A sub-logical page write command for data stored in the NVRAM is also received by the processor. In response to determining that the sub-logical page write command is for data stored in the NVRAM at the first LBA, the copy of the received data in the buffer is coalesced, by the processor, with data included in the sub-logical page write command to form a full-logical page write. Furthermore, one or more instructions to perform the full-logical page write in the NVRAM are sent by the processor.

Other aspects and embodiments of the present invention will become apparent from the following detailed description, which, when taken in conjunction with the drawings, illustrate by way of example the principles of the invention.

DETAILED DESCRIPTION

Figure 1:
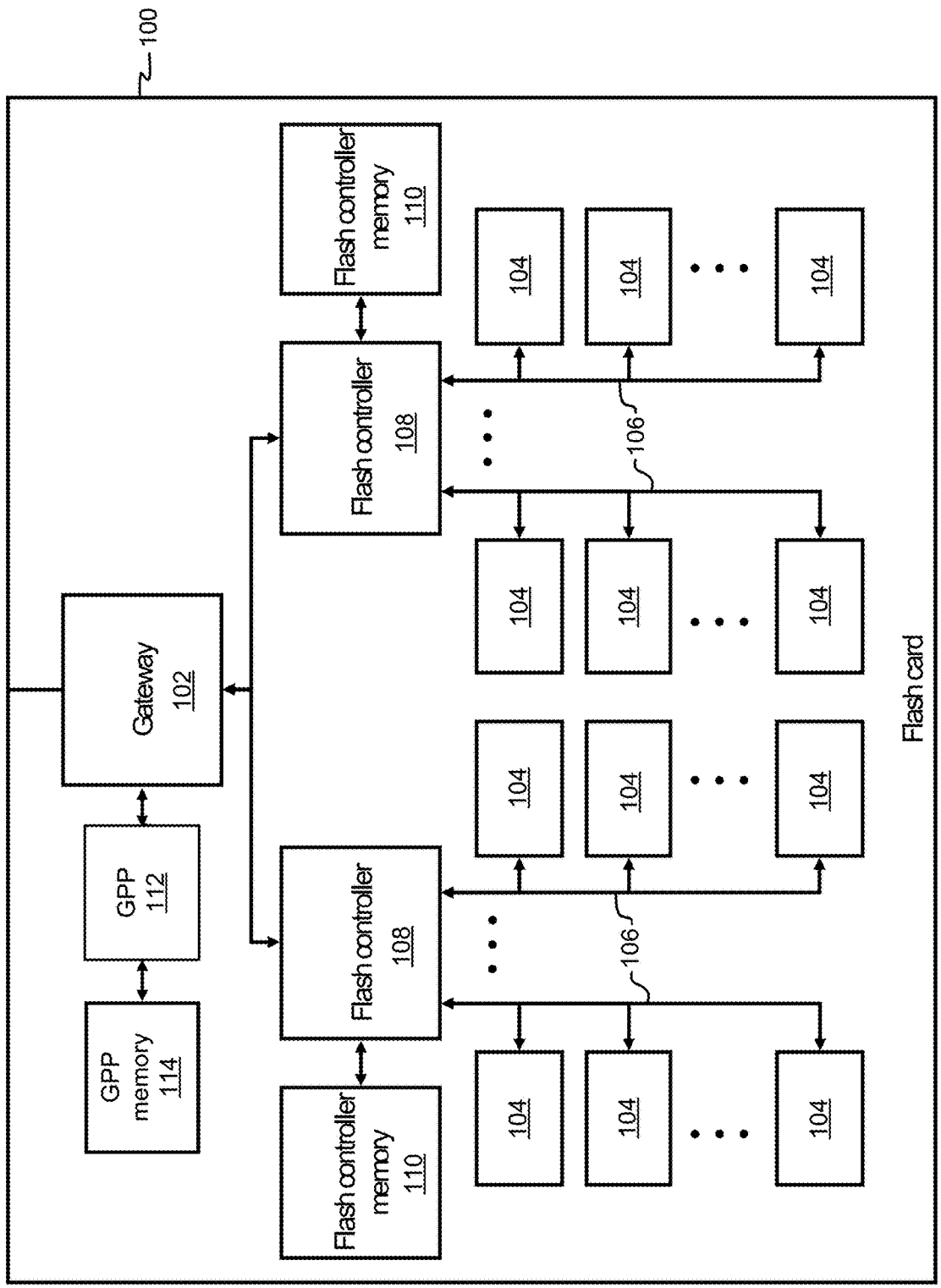
FIG. 1 is a diagram of a non-volatile memory card, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of data storage systems, as well as operation and/or component parts thereof. It should be appreciated that various embodiments herein can be implemented with a wide range of memory mediums, including for example NVRAM technologies such as NAND Flash memory, NOR Flash memory, phase-change memory (PCM), magnetoresistive RAM (MRAM) and resistive RAM (RRAM). To provide a context, and solely to assist the reader, various embodiments may be described with reference to a type of non-volatile memory. This has been done by way of example only, and should not be deemed limiting on the invention defined in the claims.

In one general embodiment, a computer-implemented method includes: receiving a sub-logical page read command for data stored in NVRAM at a first logical block address (LBA), and creating a searchable entry which includes the first LBA. Data that has been read from the NVRAM is also received, where the received data corresponds to a given LBA. In response to determining that the given LBA matches the first LBA of the searchable entry, a copy of the received data is stored in a buffer. A sub-logical page write command for data stored in the NVRAM is received, and in response to determining that the sub-logical page write command is for data stored in the NVRAM at the first LBA, the copy of the received data in the buffer is coalesced with data included in the sub-logical page write command to form a full-logical page write. Furthermore, one or more instructions to perform the full-logical page write in the NVRAM are sent.

In another general embodiment, a computer program product includes a computer readable storage medium having program instructions embodied therewith. The program instructions are readable and/or executable by a processor to cause the processor to: perform the foregoing method.

In yet another general embodiment, a system includes: a plurality of NVRAM blocks configured to store data, a processor, and logic that is integrated with and/or executable by the processor. Moreover, the logic is configured to: receive, by the processor, a sub-logical page read command for data stored in the NVRAM at a first LBA. The sub-logical page read command includes a hint and/or flag which indicates a RAID controller is a source of the sub-logical page read command. A searchable entry, which includes the first LBA, is created by the processor in a portion of memory which only includes entries that correspond to read commands issued by the RAID controller. Data that has been read from the NVRAM is also received by the processor, and in some approaches, the received data corresponds to a given LBA that matches a LBA of an entry in the portion of memory. Thus, in response to determining that the given LBA matches the first LBA of the searchable entry, a copy of the received data in a buffer is stored by the processor. A sub-logical page write command for data stored in the NVRAM is also received by the processor. In response to determining that the sub-logical page write command is for data stored in the NVRAM at the first LBA, the copy of the received data in the buffer is coalesced, by the processor, with data included in the sub-logical page write command to form a full-logical page write. Furthermore, one or more instructions to perform the full-logical page write in the NVRAM are sent by the processor.

FIG. 1 illustrates a memory card 100, in accordance with one embodiment. It should be noted that although memory card 100 is depicted as an exemplary non-volatile data storage card in the present embodiment, various other types of non-volatile data storage cards may be used in a data storage system according to alternate embodiments. It follows that the architecture and/or components of memory card 100 are in no way intended to limit the invention, but rather have been presented as a non-limiting example.

Moreover, as an option, the present memory card 100 may be implemented in conjunction with features from any other embodiment listed herein, such as those described with reference to the other FIGS. However, such memory card 100 and others presented herein may be used in various applications and/or in permutations which may or may not be specifically described in the illustrative embodiments listed herein. Further, the memory card 100 presented herein may be used in any desired environment.

With continued reference to FIG. 1, memory card 100 includes a gateway 102, a general purpose processor (GPP) 112 (such as an ASIC, FPGA, CPU, etc.) connected to a GPP memory 114 (which may comprise RAM, ROM, battery-backed DRAM, phase-change memory PC-RAM, MRAM, STT-MRAM, etc., or a combination thereof), and a number of memory controllers 108, which include Flash controllers in the present example. Each memory controller 108 is connected to a plurality of NVRAM memory modules 104 (which may comprise NAND Flash or other non-volatile memory type(s) such as those listed above) via channels 106.

According to various embodiments, one or more of the controllers 108 may be or include one or more processors, and/or any logic for controlling any subsystem of the memory card 100. For example, the controllers 108 typically control the functions of NVRAM memory modules 104 such as, data writing, data recirculation, data reading, etc. The controllers 108 may operate using logic known in the art, as well as any logic disclosed herein, and thus may be considered as a processor for any of the descriptions of non-volatile memory included herein, in various embodiments.

Moreover, the controller 108 may be configured and/or programmable to perform or control some or all of the methodology presented herein. Thus, the controller 108 may be considered to be configured to perform various operations by way of logic programmed into one or more chips, modules, and/or blocks; software, firmware, and/or other instructions being available to one or more processors; etc., and combinations thereof.

Referring still to FIG. 1, each memory controller 108 is also connected to a controller memory 110 which preferably includes a cache which replicates a non-volatile memory structure according to the various embodiments described herein. However, depending on the desired embodiment, the controller memory 110 may be battery-backed DRAM, phase-change memory PC-RAM, MRAM, STT-MRAM, etc., or a combination thereof.

Figure 2:
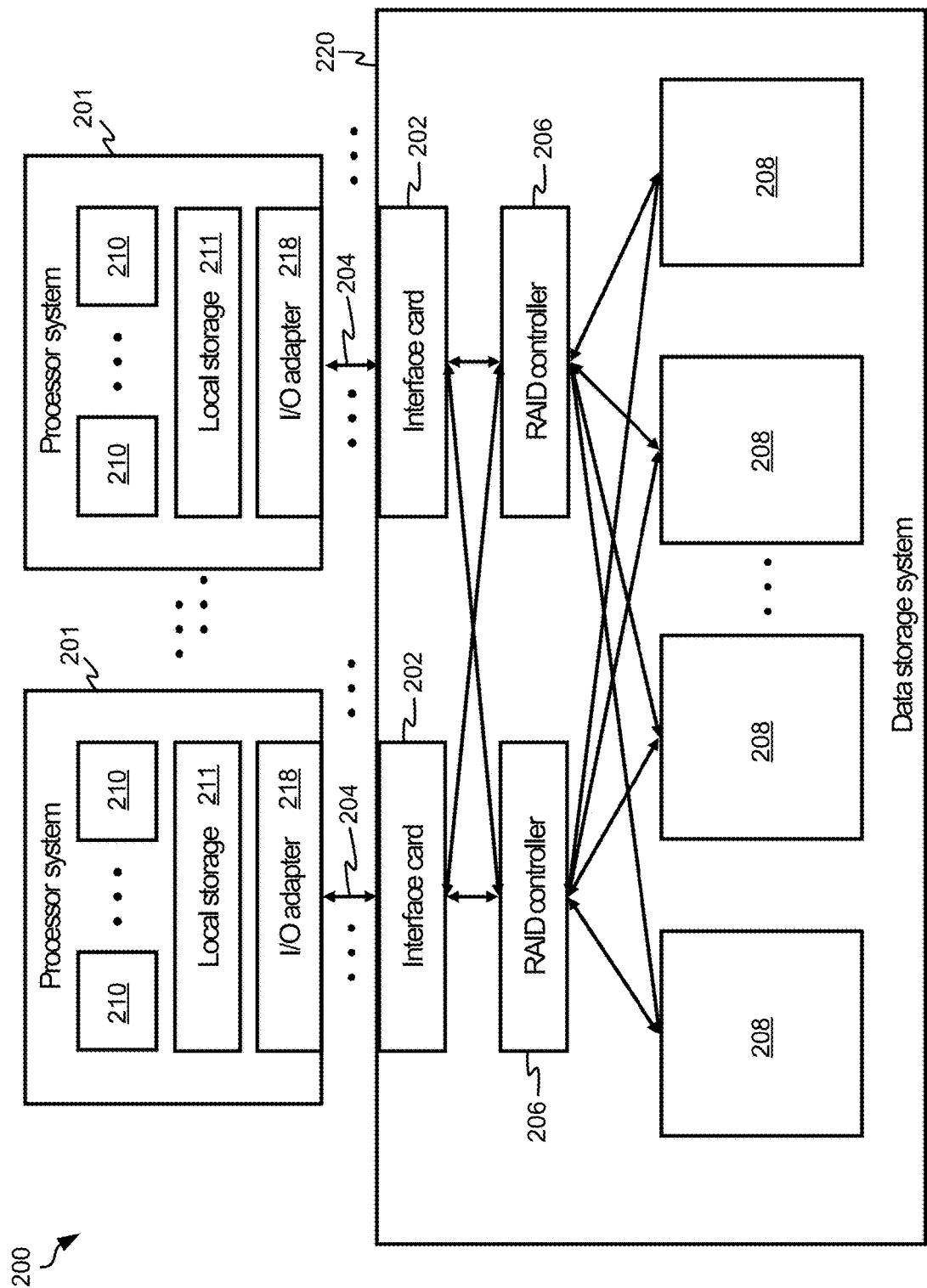
FIG. 2 is a diagram of a data storage system architecture, in accordance with one embodiment.

As previously mentioned, memory card 100 may be implemented in various types of data storage systems, depending on the desired embodiment. FIG. 2 illustrates a data storage system architecture 200 according to an exemplary embodiment which is in no way intended to limit the invention. Moreover, it should be noted that the data storage system 220 of FIG. 2 may include various components found in the embodiment of FIG. 1.

Looking to FIG. 2, the data storage system 220 comprises a number of interface cards 202 configured to communicate via I/O interconnections 204 to one or more processor systems 201. The data storage system 220 may also comprise one or more RAID controllers 206 configured to control data storage in a plurality of non-volatile data storage cards 208. The non-volatile data storage cards 208 may comprise NVRAM, Flash memory cards, RAM, ROM, and/or some other known type of non-volatile memory.

The I/O interconnections 204 may include any known communication protocols, such as Fiber Channel (FC), FC over Ethernet (FCoE), Infiniband, Internet Small Computer System Interface (iSCSI), Transport Control Protocol/Internet Protocol (TCP/IP), Peripheral Component Interconnect Express (PCIe), etc., and/or any combination thereof.

The RAID controller(s) 206 in the data storage system 220 may perform a parity scheme similar to that employed by RAID-5, RAID-10, or some other suitable parity scheme, as would be understood by one of skill in the art upon reading the present descriptions.

Each processor system 201 comprises one or more processors 210 (such as CPUs, microprocessors, etc.), local data storage 211 (e.g., such as RAM 714 of FIG. 7, ROM 716 of FIG. 7, etc.), and an I/O adapter 218 configured to communicate with the data storage system 220.

Referring again to FIG. 1, memory controllers 108 and/or other controllers described herein (e.g., RAID controllers 206 of FIG. 2) may be able to perform various functions on stored data, depending on the desired embodiment. Specifically, memory controllers may include logic configured to perform any one or more of the following functions, which are in no way intended to be an exclusive list. In other words, depending on the desired embodiment, logic of a storage system may be configured to perform additional or alternative functions, as would be appreciated by one skilled in the art upon reading the present description.

As performance capabilities of memory continue to improve, new issues are introduced to the field of data storage. For instance, multi-level cell (MLC) and triple-level cell (TLC) NAND Flash memory devices provide a low-cost and high-performance non-volatile storage medium due to the high data storage density achieved. However, logical to physical translations have been unable to progress at a similar rate and therefore have been unable to effectively support these advances in data storage densities. This limiting factor has driven conventional systems to resort to implementing larger logical page sizes. For example, an 8 KB or 16 KB logical page size has allowed for conventional systems to double or quadruple Flash density without also affecting the size standards of the logical to physical translations.

Implementing a larger logical page size such as 8 KB or 16 KB involves a fairly straightforward hardware design migration, but mitigating the unintended effects of reduced overall system performance due to an increased number RMW operations has presented greater challenges. For instance, most storage devices advertise a 512 byte (B) block size to the system, meaning that the storage devices can be accessed on 512B alignment boundaries and written in minimum sized 512B blocks. On the other hand, most existing Flash drives are designed to implement a 4, 8, or 16 KB logical page size. Therefore, most existing Flash drives are only accessible on these alignments boundaries and written to in this minimum sized logical page chunk. It should also be noted that although the various embodiments herein are described in the context of using a 4 KB logical page size, this is in no way intended to be limiting and is only for the purpose of illustration.

This discrepancy in access alignment and block size is handled in a software layer within the storage system. For example, an application which attempts a sub-4 KB write operation (i.e., a partial write operation which is less than 8 different 512B blocks) in Flash causes software to perform a series of RMW operations. These partial write operations are also referred to herein as "sub-logical page write" operations or commands. With respect to the present description, the a' portion of the RMW operation issues a read request to the Flash drive in order to access pertinent background sectors. These background sectors are thereafter merged with foreground application data in the 'M' portion of the RMW operation. Once the modify operation is complete, the 'W' portion of the RMW operation is able to finally store the data in memory. It follows that a read operation is issued prior to every sub-4 KB write operation, and as a result, write performance is substantially lower when compared to 4 KB aligned block writes (also referred to herein as a "full-logical page write" operation or command). Furthermore, additional processing overhead involved with searching and maintaining sub-4 KB LBA tables adds even more write latency delays to the process of performing the sub-4 KB write operation.

However, in sharp contrast to the foregoing issues experienced in conventional implementations, various ones of the embodiments included herein are able to improve sub-logical page write performance by utilizing sub-logical read operations that are performed. Accordingly, a RMW engine can be implemented in the command/data path which will be responsible for ensuring that only full write operation commands and data associated therewith are passed to downstream logic. Moreover, implementing a search function over the contents of a table or chart which is preferably able to maintain the LBA of active sub-logical page read operations allows for search operations performed in a LBA table to be completed in a reduced amount of time, thereby drastically improving performance. According to an example, which is in no way intended to limit the invention, content-addressable memory (CAM) may be implemented in hardware, thereby allowing for search operations performed in a LBA table to be completed in a reduced amount of time. As a result, some of the embodiments included herein are able to ensure that read and/or write coherency is maintained for RMW operations while also significantly improving overall efficiency of the storage system, e.g., as will be described in further detail below.

Figure 3:
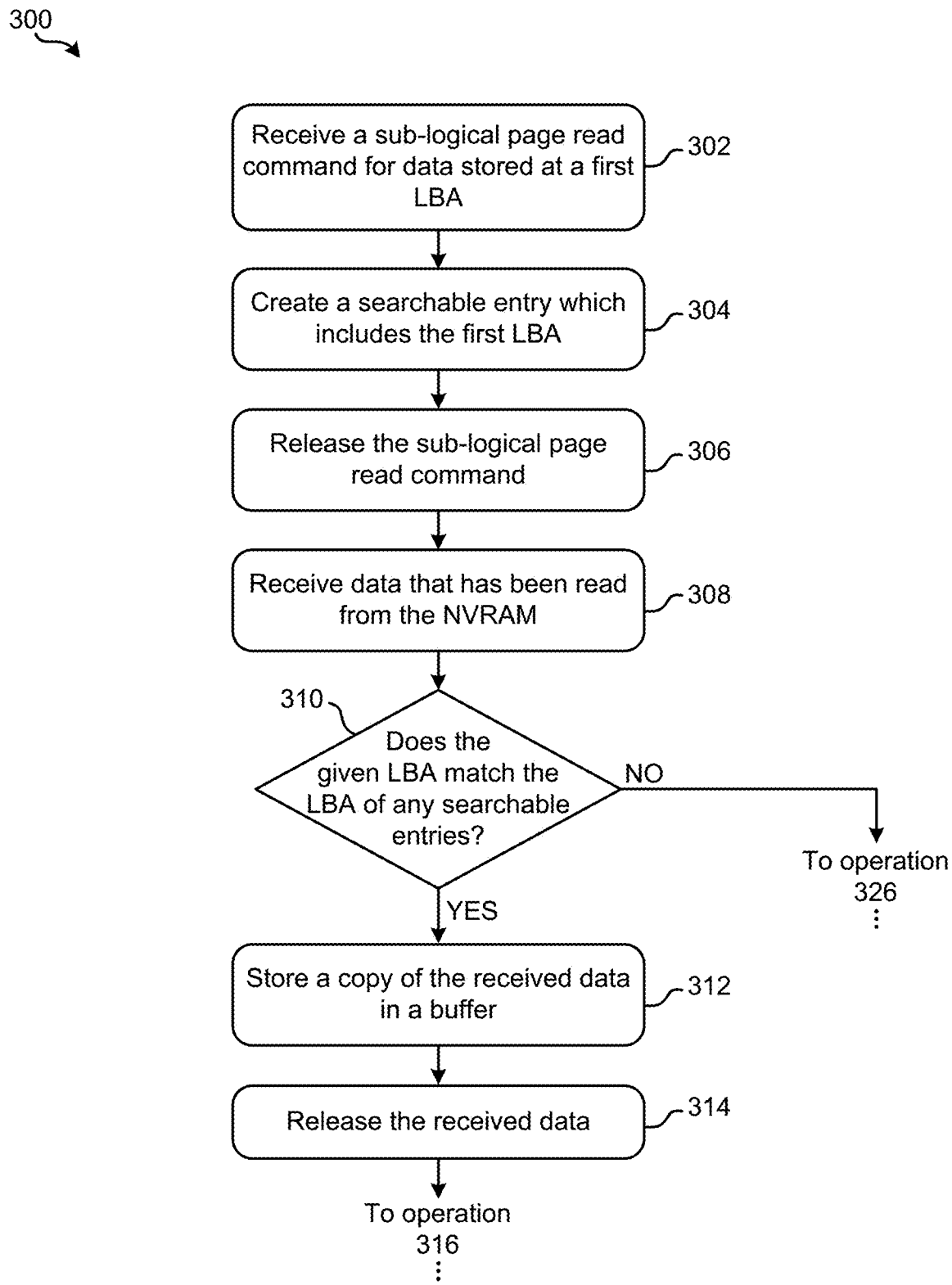
FIG. 3 is a flowchart of a method, in accordance with one embodiment.
Figure 3:
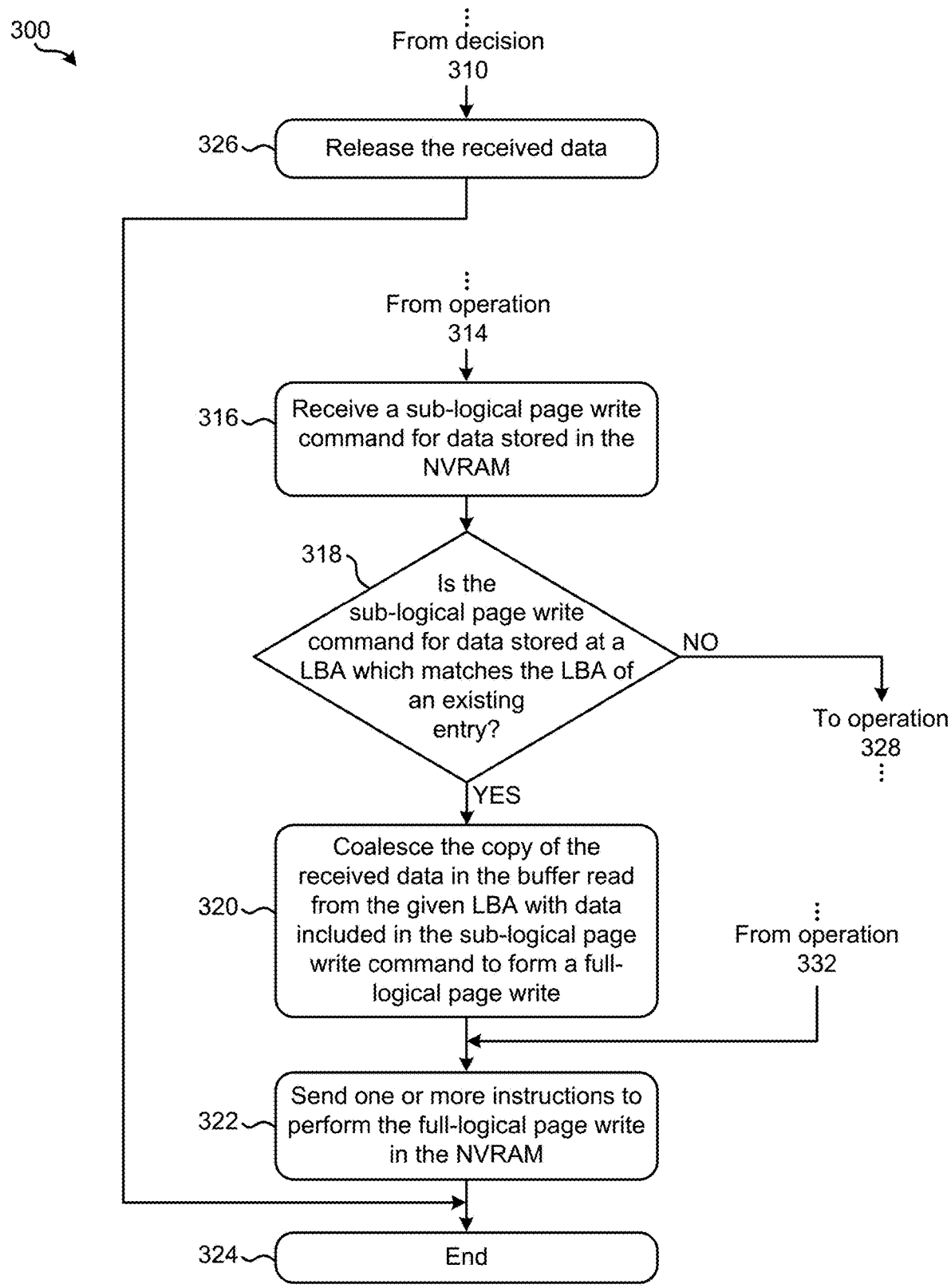
Figure 3:
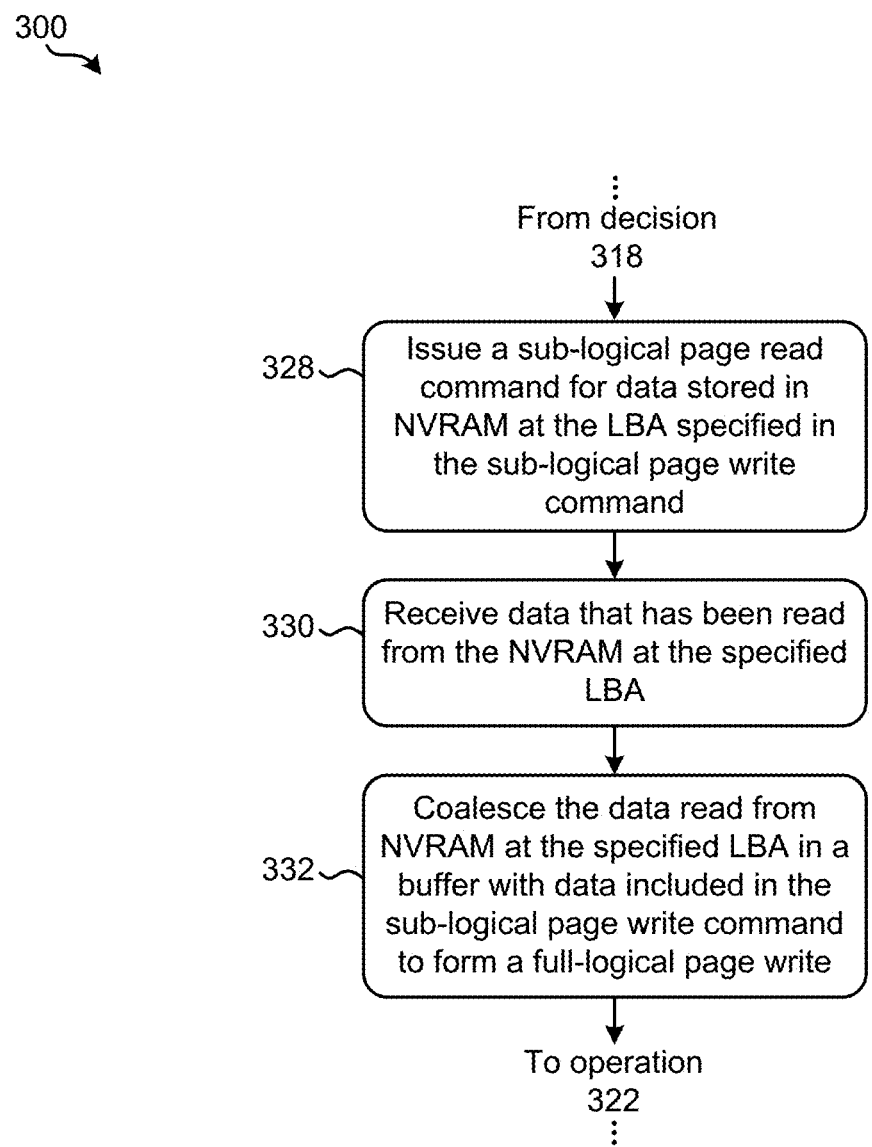

Referring now to FIG. 3, a flowchart of a method 300 for improving the performance of logical page write commands which correspond to data stored on NVRAM is shown according to one embodiment. The method 300 may be performed in accordance with the present invention in any of the environments depicted in FIGS. 1-2 and FIGS. 4A-4B, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in some embodiments one or more of the processes included in method 300 may be performed by a RMW engine and/or a controller included therein (e.g., see FIG. 4A below). In various other embodiments, the method 300 may be partially or entirely performed by a controller, a processor, a computer, etc., or some other device having one or more processors therein. Thus, in some embodiments, method 300 may be a computer-implemented method. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, operation 302 of method 300 includes receiving a sub-logical page read command for data stored in NVRAM at a first LBA. As mentioned above, the first LBA represents the logical address which corresponds to the particular data that the read command is intending to read. The first LBA further corresponds to a particular physical block address (PBA) which represents the physical location in memory (e.g., a specific location in a die and/or chip) at which the particular data intending to read is physically stored. The relationship between LBAs and PBAs is managed in a LPT in preferred approaches, which is updated accordingly in order to maintain an accurate representation of the data stored in the NVRAM as a whole.

The sub-logical page read command received in operation 302 may be received from different locations depending on the particular approach. For instance, the sub-logical page read command may be received from a host, one or more running applications, a storage network which is electrically coupled to the NVRAM, etc., depending on the desired approach. However, according to an illustrative approach, which is in no way intended to limit the invention, the sub-logical page read command may be received from a RAID controller. The sub-logical page read command may include a flag, hint, metadata, etc. which indicates that the command was issued by a RAID controller. This may allow for the sub-logical page read command to be processed differently than other commands that may be received. As alluded to above, some of the embodiments included herein are able to improve performance of sub-logical write commands by utilizing preexisting sub-logical page read commands.

For example, RAID controller functionality is performed in either software or hardware depending upon implementation and maintains coherent parity for data organized in stripes across the drives. In order to achieve this functionality, the RAID controller issues a read operation before each write operation so that the contribution of the previous data to parity for the given RAID stripe can be removed. Accordingly, these RAID read operations may be leveraged by some of the embodiments included herein in order to obviate the performance of additional sub-logical page read operations. In other words, the data that is read during such RAID read operations may be examined inside a controller and used to pre-populate a buffer with background data. Again, this obviates the performance of read operations in situations that would otherwise involve performing a RMW procedure, e.g., as will soon become apparent.

Moreover, although operation 302 includes receiving a sub-logical page read command, it should be noted that different types of commands, requests, instructions, etc., may be received during operation. For example, a data write operation may be received. Furthermore, a data write operation includes a partial write operation in some situations, while in other situations a data write operation includes a full write operation, e.g., as will be described in further detail below.

With continued reference to FIG. 3, method 300 proceeds to operation 304 which includes creating a searchable entry which includes the first LBA. As described above, performing NVRAM read and write operations involves searching a LBA table. Thus, in some approaches the searchable entry is created in a portion of memory which only includes entries that correspond to read commands issued by the RAID controller, e.g., for improved searchability. For example, the searchable entry may actually be a CAM entry created in a CAM module. However, it should be noted that the use of CAM is in no way intended to limit the invention. Rather, any processes which are able to provide a search function over the contents of a table or chart which is preferably able to maintain the LBA of active sub-logical page read operations may be implemented, e.g., as would be appreciated by one skilled in the art after reading the present description.

It should also be noted that although operation 304 involves creating a single searchable entry, any number of searchable entries may already exist, e.g., as a result of previous iterations of method 300. In other words, other sub-logical page read commands may be received over time, thereby resulting in any number of CAM entries existing in a CAM module (e.g., see 404 of FIG. 4).

Referring still to FIG. 3, operation 306 includes releasing the sub-logical page read command such that it is allowed to pass through to the NVRAM for implementation. Again, the various processes in method 300 may be performed by RMW engine and/or a controller included therein (e.g., see FIG. 4A below). It follows that commands, requests, operations, etc. may be received from various hosts, RAID controllers, running applications, etc., and passed along to memory for implementation.

Proceeding to operation 308, data that has been read from the NVRAM is received. In other words, data that has been read from NVRAM as a result of performing the sub-logical page read command released in operation 306 is eventually received. This data that has been received corresponds to a given LBA which is preferably indicated in the data that is received. Accordingly, decision 310 includes determining whether the given LBA matches the LBA of any entries that have been created. As noted above, although operation 304 may involve creating a single CAM entry, any number of CAM entries may already exist, e.g., as a result of previous iterations of method 300. Thus, decision 310 may include determining whether the LBA associated with the data that has been read from the NVRAM in operation 308 is already currently stored in a CAM.

As mentioned above, this effectively eliminates the performance delays experienced by conventional systems, thereby also drastically improving efficiency. For instance, decision 310 may be performed in a single clock cycle regardless of the number of the searchable entries in preferred approaches. Implementing a physical searchable collection of entries (e.g., CAM entries) allows for latency to be reduced significantly, e.g., as would be appreciated by one skilled in the art after reading the present description.

In response to determining that the given LBA matches an LBA that is currently stored in the searchable contents of a table or chart, method proceeds from decision 310 to operation 312. For instance, in response to determining that the LBA associated with the data that has been read from the NVRAM in operation 308 matches the LBA created in operation 304 method 300 proceeds to operation 312. There, operation 312 includes storing a copy of the received data in a buffer. The buffer may be a local buffer that is reserved for copies of data that have been read from NVRAM. In some approaches, an existing buffer may be full whereby one or more additional buffers may be formed to store the data received from the NVRAM.

Operation 314 further includes releasing the received data, e.g., such that it is allowed to pass through to its intended destination. With respect to the present description, the "intended destination" preferably refers to the location, entity, application, etc. which issued the sub-logical page read command. According to an example, the sub-logical page read command may have been issued from a RAID controller, whereby operation 314 includes releasing the received data such that it is allowed to pass through to the RAID controller, thereby satisfying the sub-logical page read command.

Proceeding to operation 316, method 300 includes receiving a sub-logical page write command for data stored in the NVRAM. The sub-logical page write command may also indicate the LBA which the command corresponds to, e.g., such that the NVRAM is able to perform the write command correctly. Accordingly, decision 318 includes determining whether the sub-logical page write command is for data stored in the NVRAM at a specified LBA which matches a LBA of any existing entry in the searchable contents of a table or chart. Once again, implementing a physical searchable collection of entries (e.g., CAM entries) allows for latency to be reduced significantly. For instance, decision 318 may be performed in a single clock cycle regardless of the number of entries in preferred approaches. However, this determination may be made by comparing the LBA received with the sub-logical page write command with the LBAs of the various searchable entries in any desired manner.

In response to determining that the sub-logical page write command is for data stored in the NVRAM at a specified LBA which does match the LBA of an existing searchable entry, method 300 proceeds from decision 318 to operation 320. For example, method 300 proceeds to operation 320 in response to determining that the sub-logical page write command is for data stored in the NVRAM at the same LBA as the sub-logical page read command initially received in operation 302.

Looking to operation 320, the copy of the received data in the buffer read from the given LBA is coalesced with data included in the sub-logical page write command to form a full-logical page write. In other words, the data that has been pre-populated in the buffer from the full logical page which corresponds to the LBA indicated in the sub-logical page write command is preferably combined with the data included in the sub-logical page write command itself to form a full-logical page write command. Moreover, operation 322 includes sending one or more instructions to perform the full-logical page write in the NVRAM. The full-logical page write operation is preferably performed at a PBA in NVRAM which corresponds to the LBA that was indicated in the sub-logical page write command, and which matched the LBA associated with the data stored in the buffer. The PBA may be determined by accessing a LPT which includes the correlation between LBAs and PBAs, e.g., as would be appreciated by one skilled in the art after reading the present description.

From operation 322, the flowchart of FIG. 3 proceeds to operation 324, whereby method 300 may end. However, it should be noted that although method 300 may end upon reaching operation 324, any one or more of the processes included in method 300 may be repeated in order to satisfy other sub-logical page write commands. In other words, any one or more of the processes included in method 300 may be repeated for subsequently received sub-logical page write commands.

Returning momentarily now to decision 310, in some situations data that has been read from memory may not match any of the existing searchable entries. Again, data that has been read from memory corresponds to a given LBA which is preferably indicated in the data that is received. This LBA may thereby be used to determine whether it corresponds to any existing searchable entries. In response to determining that the given LBA does not match the LBA of any existing searchable entry, method 300 proceeds to operation 326. There, operation 326 includes further includes releasing the received data, e.g., such that it is allowed to pass through to its intended destination. As noted above, the "intended destination" preferably refers to the location, entity, application, etc. which issued the sub-logical page read command.

According to an example, the sub-logical page read command may have been issued from a RAID controller, whereby operation 326 includes releasing the received data such that it is allowed to pass through to the RAID controller, thereby satisfying the sub-logical page read command. Moreover, from operation 326, the flowchart of FIG. 3 proceeds directly to operation 324, whereby method 300 may end, e.g., as described above.

Returning now to decision 318, in other situations a sub-logical page write command may be received which does not any of the existing searchable entries. Thus, in response to determining that the sub-logical page write command is for data stored in the NVRAM at a specified LBA which does not match the LBA of an existing searchable entry, method 300 proceeds from decision 318 to operation 328. There, operation 328 includes issuing a sub-logical page read command for data stored in NVRAM at the LBA specified in the sub-logical page write command. As noted above, sub-logical page write commands have previously involved performing a RMW process in order to access background sectors which are used to form a full-page write. These background sectors are accessed by issuing a read operation prior to performing the write operation, e.g., as would be appreciated by one skilled in the art after reading the present description. Thus, the sub-logical page read command issued in operation 328 preferably allows for a full-logical page write operation to be performed, e.g., as will soon become apparent.

Proceeding to operation 330, data that has been read from the NVRAM at the specified LBA is received. Moreover, operation 332 includes coalescing the data read from NVRAM at the specified LBA in a buffer with data included in the sub-logical page write command to form a full-logical page write. It follows that any one or more of the approaches described above with respect to performing operation 320. From operation 332, method 300 proceeds directly to operation 322 whereby one or more instructions are sent to perform the full-logical page write in the NVRAM. Depending on the approach, the one or more instructions sent in operation 322 may be sent to a storage controller, one or more processors in the NVRAM, or any other computing device which is capable of actually causing the data to be written at the PBA which corresponds to the respective LBA.

It follows that the various processes included in method 300 are able to significantly reduce the number of processing overhead experienced by the system as a result of performing sub-logical page write operations. In turn, this also reduces write latency, improves throughput, decreases memory die and/or logical unit number use, etc.

These improvements are achieved as a result of each sub-logical page write command being preceded by a corresponding sub-logical page read command. Although these preceding sub-logical page read commands are typically issued by a RAID controller as an aspect of updating RAID parity information, it should be noted that this is in no way intended to limit the invention. Rather, any sub-logical page read operation which is issued prior to a sub-logical page write command may be utilized according to the various processes described in the various embodiments herein. As noted above, because all of the sectors of a logical page are available for any sized Sub-logical page read operation, a RMW engine can be developed which inspects these system level read commands which are typically issued by the RAID controller.

Again, when a sub-logical page read command is received from the RAID controller, a searchable entry can be made which incorporates the corresponding LBA value. The RMW engine can then inspect data that has been read as a result of the sub-logical page read command, and which is being returned to the RAID controller. It follows that when a read completion arrives with an LBA which matches the LBA of a valid searchable entry, all sectors for the corresponding logical page can be placed into an unused buffer. Once the RAID controller receives the results of the sub-logical page read command that was issued, the corresponding sub-logical page write command may be issued to NVRAM. Upon receiving the sub-logical page write command, the RMW engine is able to search in the contents of a table or chart for any entries which have the same LBA as the sub-logical page write command. In response to identifying a match, the process is thereby able to identify a buffer that already has the contents of the full logical page populated therein e.g., as a result of performing the sub-logical page read command issued by the RAID controller. The data received along with the sub-logical page write command may thereby be compiled with the data pre-populated in the buffer at the proper sector positions, and a full logical page write command may be issued immediately without delay.

As mentioned above, one or more of the processes included in method 300 may be performed by a RMW engine and/or a controller included therein. Looking specifically to FIG. 4A, a handler module 400 is illustrated in accordance with one embodiment. As an option, the present handler module 400 may be implemented in conjunction with features from any other embodiment listed herein, such as those described with reference to the other FIGS., such as FIG. 3. However, such handler module 400 and others presented herein may be used in various applications and/or in permutations which may or may not be specifically described in the illustrative embodiments listed herein. Further, the handler module 400 presented herein may be used in any desired environment. Thus FIG. 4A (and the other FIGS.) may be deemed to include any possible permutation.

Figures 4A, 4B:
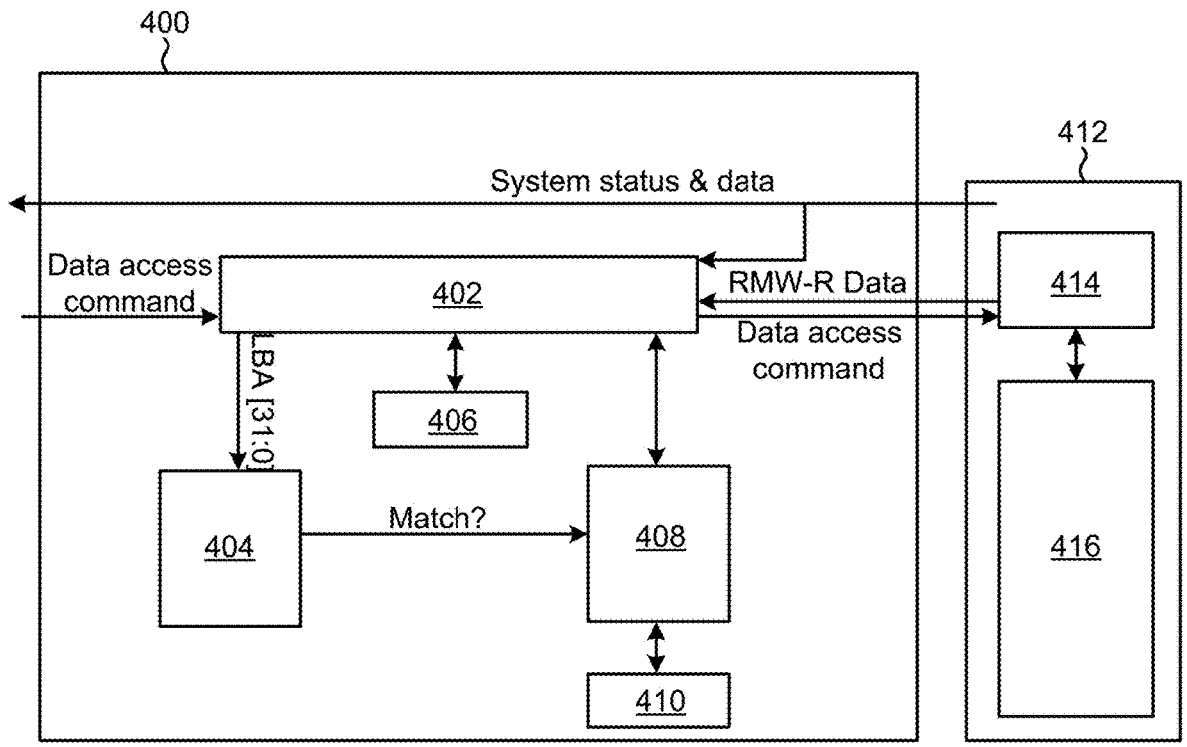
FIG. 4A is a partial schematic view of a handler module, in accordance with one embodiment.
FIG. 4B is a partial representational view of a sub-logical page state table, in accordance with one embodiment.

The specific handler module 400 depicted in FIG. 4A is an exemplary sub-logical page RMW handler module which has CAM assist capabilities, e.g., as will soon become apparent. As shown, the handler module 400 includes a number of components which process information based on data access commands which are received. These data access commands may be received from a user, a central storage controller, a remote storage location over a network connection, etc., depending on the approach. The actual data access commands which are received also vary depending on the given approach.

Specifically, a controller 402 receives the data access command(s) and processes them accordingly, e.g., by performing any one or more of the processes described above with respect to method 300. Accordingly, the controller 402 may include any desired types and/or amount of control logic. The controller 402 is also coupled to a CAM module 404, sub-logical page data memory (SLDM) 406, and a RMW engine 408 which is in turn coupled to a sub-logical page state table (SLST) 410.

Looking specifically to the different types of information exchanged between the various components included in the handler module 400, the controller 402 receives a data access command and provides the LBA associated with the data access command (here "LBA [31:1]") to the CAM module 404. As described above, the CAM module 404 is able to determine whether any sub-logical page read commands which correspond to a same LBA as a sub-logical page write command have been performed. Moreover, this may be performed in some approaches in a single clock cycle. Accordingly, the handler module 400 is able to significantly improve partial write operation performance by utilizing preexisting sub-logical page read operations on NVRAM drives as represented in hardware rather than relying on software.

The specific design (e.g., size) and/or configuration of the CAM module 404 may vary depending on the desired approach. According to an example, which is in no way intended to limit the invention, the CAM module 404 may have a design of 256×32. In another example, the CAM module 404 may have a design of 64×32.

Again, the CAM module 404 determines whether any sub-logical page read commands which correspond to a same LBA as a sub-logical page write command have been performed, and provide a result of such determination to the RMW engine 408. Accordingly, the RMW engine 408 can be implemented in the command/data path which is responsible for ensuring that full-logical page write operation commands and data associated therewith are passed to downstream logic and/or components.

The RMW engine 408 also has indirect access to the SLDM 406 through the controller 402. Accordingly, the RMW engine 408 is able to utilize the SLDM 406 in order to stage sub-logical page system write data blocks until either the handler module 400 (or overarching storage system) follows up with the remaining blocks of the given logical page or the data that has been read by a sub-logical page read command is returned with any associated background data. However, full-logical page write commands (and the corresponding data) are issued to the NVRAM without consulting the SLDM 406.

The SLST 410 is also used to maintain state over, and store command information for, all in-progress sub-logical page read operations. Thus, as read and/or write commands are received at the handler module 400, the SLST 410 is searched based on the LBA which corresponds to a respective active entry. New entries are also added to the SLST 410 each time a sub-logical page read command is received and processed. Moreover, when a sub-logical page read operation has already been completed, the corresponding location in the SLST 410 is looked up based on the LBA which is also returned with data that has already been read, e.g., as a part of a RAID update operation. The LBA address is presented to the CAM as the search pattern in order to obtain the address in the SLST where the pertinent data for this previous sub-logical page read context is stored. In some approaches, SLST 410 is looked up based on indexing information which may be stored in another TAG Index memory (not shown).

Referring momentarily to FIG. 4B, an illustrative implementation of the SLST 410 in FIG. 4A is depicted in accordance with one embodiment, which is in no way intended to limit the invention. As shown, the SLST 410 includes a number of rows which each correspond to a different SLST Address as indicated in the Addr column. According to exemplary approaches, these SLST Addresses are used to index into an associated SLDM buffer memory, e.g., as would be appreciated by one skilled in the art after reading the present description.

The Valid [1] (42) column is used to indicate whether a sub-logical page read command is running for each of the associated LBA entries. Moreover, the Read Comp Drop [1] (41) column is used to signal whether the data received as a result of the read portion of the respective sub-logical page read command, should be dropped (e.g., ignored). This occurs in situations which involve a sub-logical page write operation which has been fully coalesced, or another full-logical page write operation corresponding to the same LBA is received. The Read Pending [1] (40) column indicates the corresponding head of line blocking indicator which is read for in-progress coalescing purposes, e.g., as would be appreciated by one skilled in the art after reading the present description. Further still, the Buff_State [8] (39:31) column provides a per bit indicator of valid foreground sectors received from the system, which can include 8B, 16B, 32B, etc. logical page sizes. Finally, the LBA [31] (31:0) column lists the LBA associated with each of the respective entries.

Returning back to FIG. 4A, the CAM module 404 is a unique type of memory storage device which is used in significantly high-speed searching applications. The CAM module 404 operates by comparing an input search pattern (or string) against a table of stored data, and returns the address of matching data when found. Alternatively, an indication that the pattern does not exist in the table is returned when a match is not found. When the search pattern is found, it is referred to as a "CAM match" or "CAM hit". For write operations, the CAM module 404 essentially behaves like RAM, where a specific address is used to change the contents of an associated memory location. However, for read operations the data/pattern is provided to the CAM module 404 and the memory address of that data/pattern is returned if it exists in the CAM module 404. For sub-logical page read commands as described herein, the address returned by the CAM module 404 is used to index directly into the SLST 410 to obtain state information, e.g., as would be appreciated by one skilled in the art after reading the present description. However, as noted above, the implementation of a CAM module specifically is in no way intended to limit the invention, as other approaches may implement any desired type of searchable entries.

The controller 402 is further coupled to the downstream NVRAM 412. Specifically, the controller 402 is coupled to a storage controller 414 in the NVRAM 412, which in turn communicates with the physical data storage modules 416. The handler module 400 is thereby able to send specific data access commands and/or data to the NVRAM 412 as well as receive data read from the NVRAM 412. For example, data that is read from NVRAM 412 as a part of a RAID read operation performed before each write operation may be at least temporarily received by the controller 402. As noted above, this data may be en route to a RAID controller which issued the read operation and may be leveraged in order to obviate the performance of additional sub-logical page write operations. In other words, the data that is read during such RAID read operations may be examined inside a controller and used to pre-populate a buffer with background data before being sent to a RAID controller which initially issued the read operation.

Accordingly, a copy of system status information and data read from NVRAM 412 is illustrated as being used by the controller 402 to pre-populate one or more buffers with background data. These pre-populated buffers may thereby be used to improve the efficiency by which sub-logical page write operations are performed by the system, e.g., as described in the various approaches herein. It should also be noted that the NVRAM 412 may include any desired type of memory, e.g., depending on the desired approach. For example, in some approaches the NVRAM 412 includes Flash memory. In further approaches, the NVRAM 412 includes NAND Flash memory.

Figure 5:
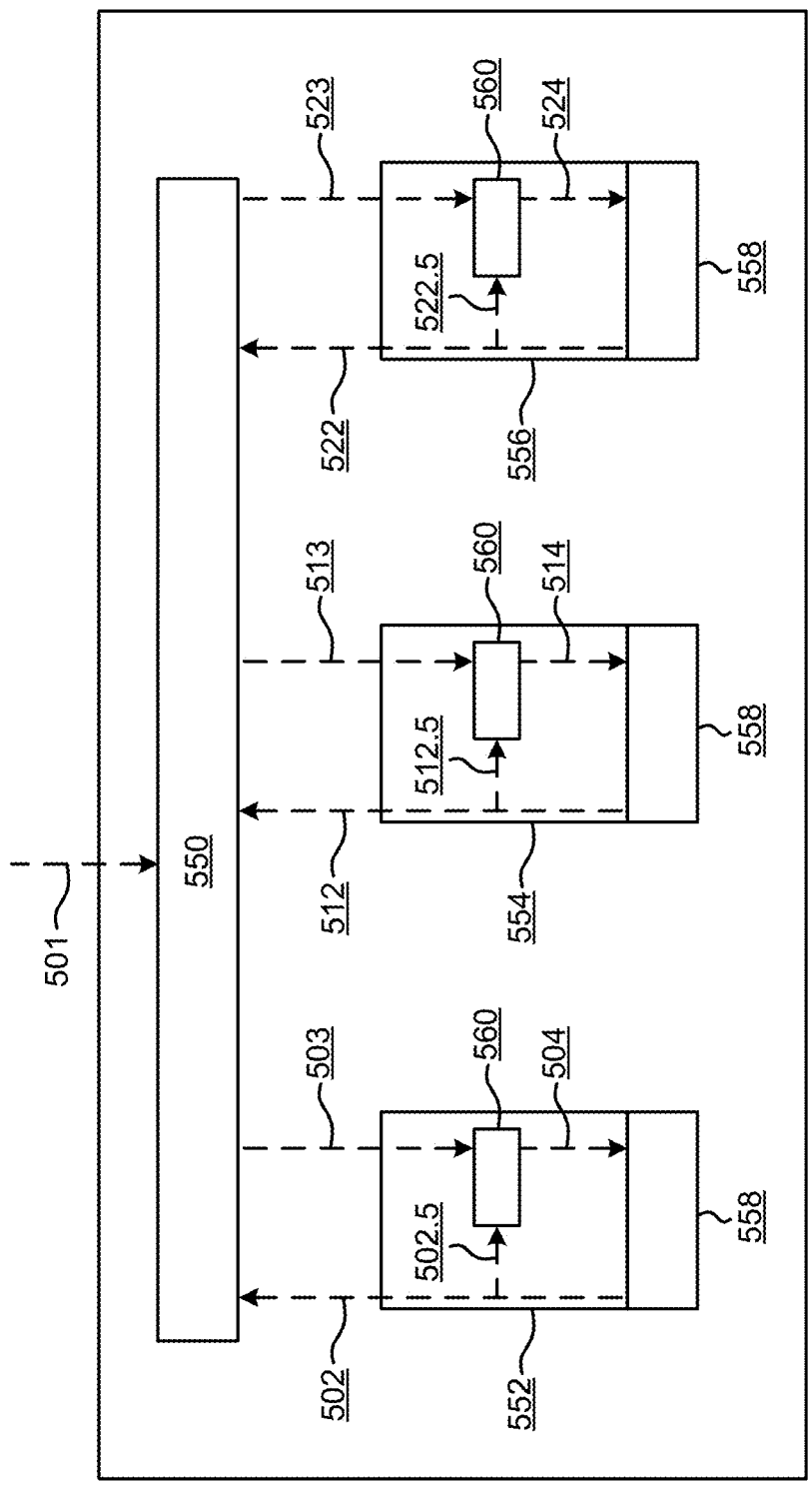
FIG. 5 is a partial representational view of the flow of how RMW buffers are pre-populated as a byproduct of RAID controller, in accordance with one embodiment.

According to an in-use example, which is in no way intended to limit the invention, FIG. 5 illustrates a series of processes that are performed in response to receiving a sub-logical page write command. These processes are depicted as being performed in an environment which includes a RAID controller 550 that is coupled to a data drive 552 and two parity drives 554, 556. Each of the drives 552, 554, 556 are further coupled to a RAM component 558 which may include Flash memory. It should also be noted that any of the components and/or processes depicted in FIG. 5 may implement any one or more of the approaches described herein, e.g., as would be appreciated by one skilled in the art after reading the present description.

As depicted by process 501, a sub-logical page write command is initially received at a RAID controller 550, e.g., from a host, running application, central storage controller, etc. As previously mentioned, RAID controller functionality is performed in either software or hardware depending upon implementation and maintains coherent parity for data organized in stripes across the drives. In order to achieve this functionality, the RAID controller issues a read operation before each write operation so that the contribution of the previous data to parity for the given RAID stripe can be removed. This read operation is also applied across each of the drives which include data in the given RAID stripe.

Thus, in response to receiving the sub-logical page write command, the RAID controller 550 issues a first read command to the RAM component 558 of data drive 552. Data that has been read from the RAM component 558 is returned to the RAID controller 550 in response to the first read command that was issued. See process 502. However, this data passes through data drive 552 before reaching the RAID controller 550. Accordingly, these RAID read operations may be leveraged in order to obviate the performance of subsequent sub-logical page write operations. In other words, the data that is read during such RAID read operations may be examined by the data drive 552 and used to pre-populate a buffer 560 with background data which corresponds to the sub-logical page write command initially received at process 501.

Process 502.5 thereby includes pre-populating a buffer with the data that was read from the RAM component 558 in response to the first read command issued by the RAID controller. It follows that when the sub-logical page write command is eventually received at the data drive 552 (see process 503), the data that has been pre-populated in the buffer may be used in combination with the data in the sub-logical page write command to form a full-logical page write command. Moreover, looking to process 504, this full-logical page write command is issued to the RAM component 558 of data drive 552 for implementation.

It follows that the full-logical page write command is formed without having to issue any supplemental read operations to memory. In other words, various ones of the approaches herein are able to obviate the performance of the "read" (R) portion of a RMW operation. This desirably reduces processing overhead, system traffic, performance delays, etc., thereby significantly improving efficiency. The foregoing processes are repeated for each of the two parity drives 554, 556, e.g., see processes 512-514 and 522-524 respectively. Again, each of the drives 552, 554, 556 include data which corresponds to the received sub-logical page write command. Each of the drives 552, 554, 556 thereby contribute data that is accumulated in the pre-populated buffer, and later used to perform the full-logical page write command.

Again, various ones of the embodiments included herein are able to ensure that when a sub-logical page read command is received from the RAID controller, a searchable entry can be made which incorporates the corresponding LBA value. The RMW engine can then inspect data that has been read as a result of the sub-logical page read command, and which is being returned to the RAID controller. It follows that when a read completion arrives with an LBA which matches the LBA of a valid searchable entry, all sectors for the corresponding logical page can be placed into an unused buffer. Once the RAID controller receives the results of the sub-logical page read command that was issued, the corresponding sub-logical page write command may be issued to NVRAM.

Upon receiving the sub-logical page write command, the RMW engine is able to search in a table or chart for any entries which have the same LBA as the sub-logical page write command. In response to identifying a match, the process is thereby able to identify a buffer that already has the contents of the full logical page populated therein e.g., as a result of performing the sub-logical page read command issued by the RAID controller. The data received along with the sub-logical page write command may thereby be compiled with the data pre-populated in the buffer at the proper sector positions, and a full logical page write command may be issued immediately without delay.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 6:
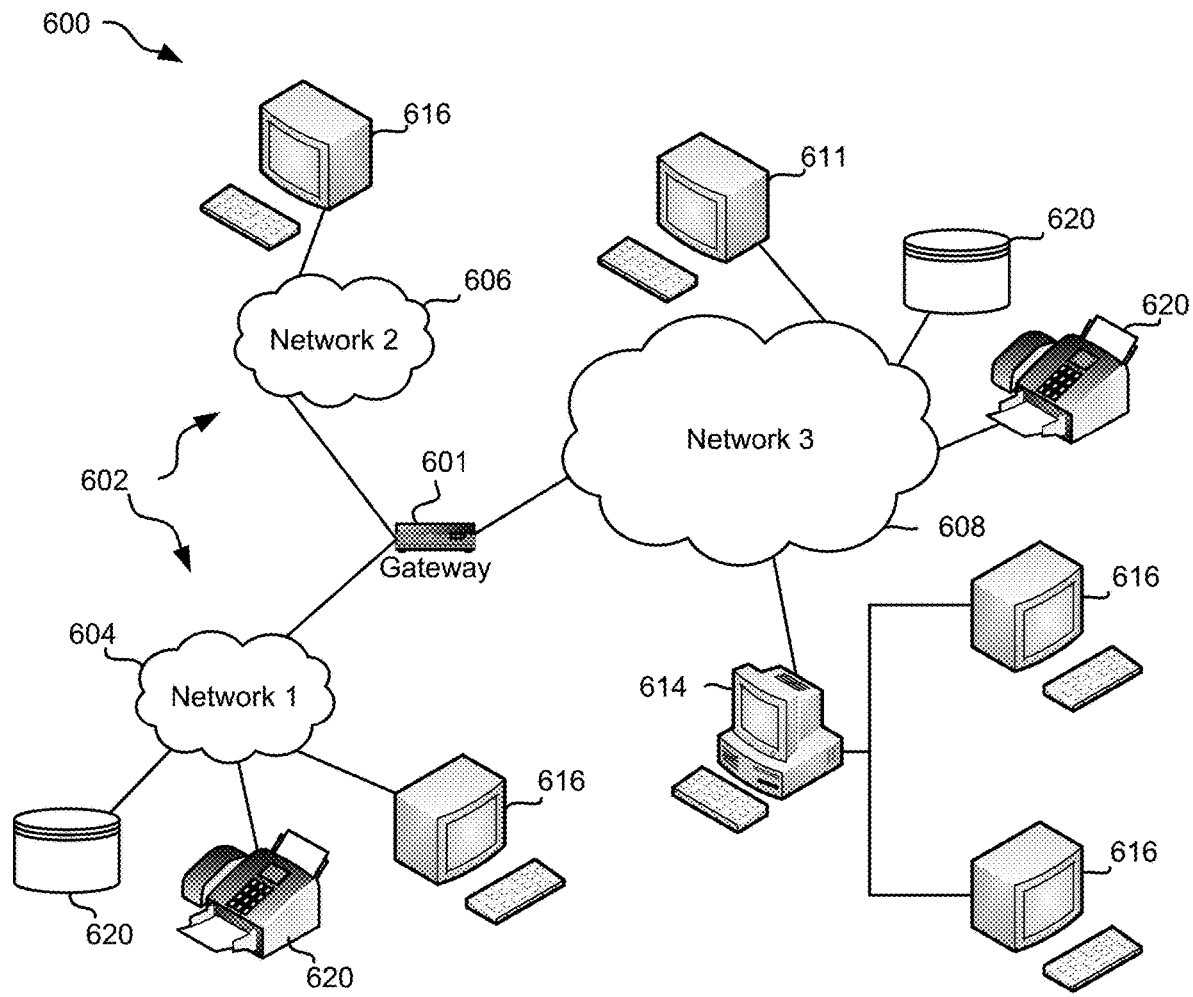
FIG. 6 is a network architecture, in accordance with one embodiment.

FIG. 6 illustrates a network architecture 600, in accordance with one embodiment. As shown in FIG. 6, a plurality of remote networks 602 are provided including a first remote network 604 and a second remote network 606. A gateway 601 may be coupled between the remote networks 602 and a proximate network 608. In the context of the present network architecture 600, the networks 604, 606 may each take any form including, but not limited to a LAN, a WAN such as the Internet, public switched telephone network (PSTN), internal telephone network, etc.

In use, the gateway 601 serves as an entrance point from the remote networks 602 to the proximate network 608. As such, the gateway 601 may function as a router, which is capable of directing a given packet of data that arrives at the gateway 601, and a switch, which furnishes the actual path in and out of the gateway 601 for a given packet.

Further included is at least one data server 614 coupled to the proximate network 608, and which is accessible from the remote networks 602 via the gateway 601. It should be noted that the data server(s) 614 may include any type of computing device/groupware. Coupled to each data server 614 is a plurality of user devices 616. Such user devices 616 may include a desktop computer, laptop computer, handheld computer, printer, and/or any other type of logic-containing device. It should be noted that a user device 611 may also be directly coupled to any of the networks, in some embodiments.

A peripheral 620 or series of peripherals 620, e.g., facsimile machines, printers, scanners, hard disk drives, networked and/or local data storage units or systems, etc., may be coupled to one or more of the networks 604, 606, 608. It should be noted that databases and/or additional components may be utilized with, or integrated into, any type of network element coupled to the networks 604, 606, 608. In the context of the present description, a network element may refer to any component of a network.

According to some embodiments, methods and systems described herein may be implemented with and/or on virtual systems and/or systems which emulate one or more other systems, such as a UNIX system which virtually hosts an operating system environment, etc. This virtualization and/or emulation may be enhanced through the use of VMWARE software, in some embodiments.

In other embodiments, one or more networks 604, 606, 608, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 7:
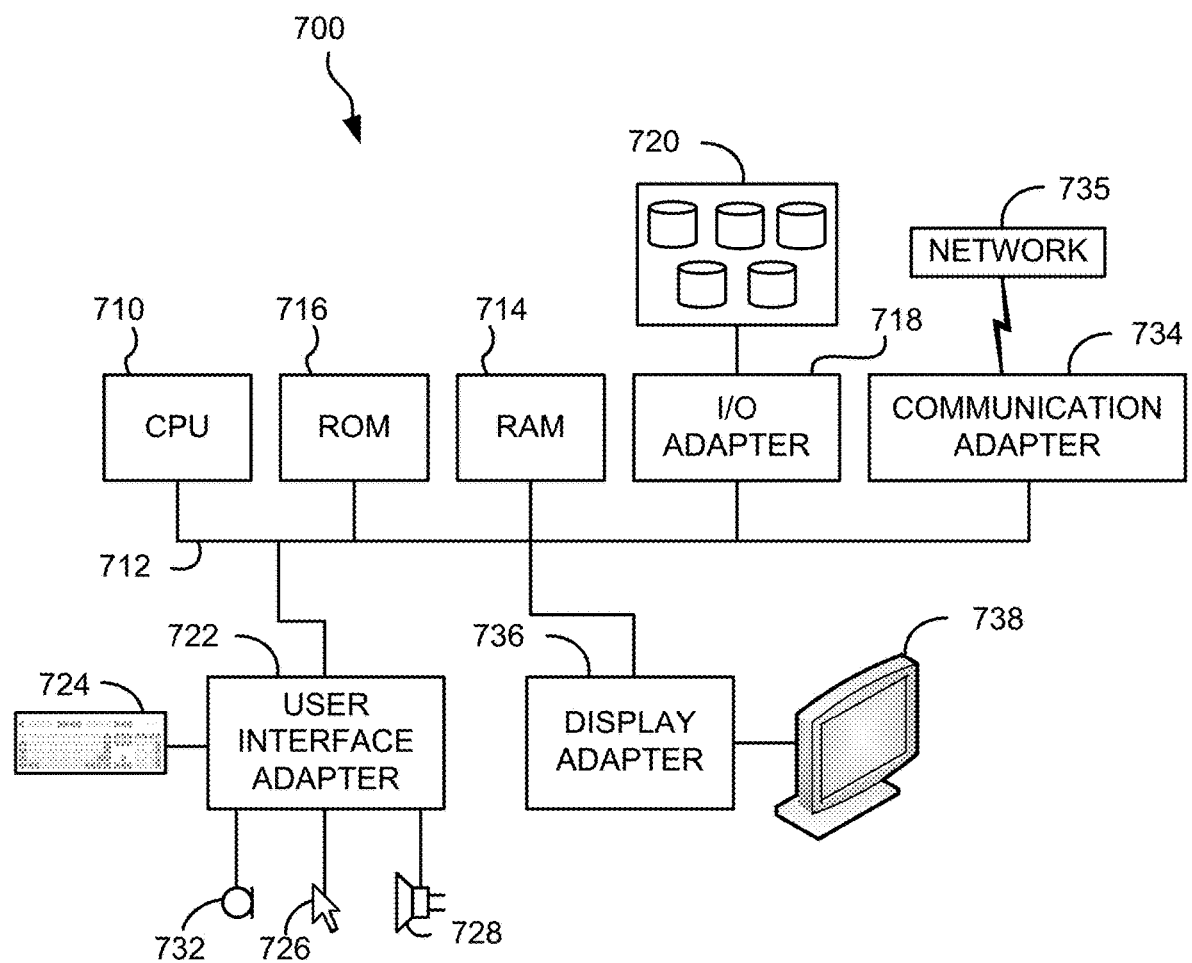
FIG. 7 is a representative hardware environment that may be associated with the servers and/or clients of FIG. 6, in accordance with one embodiment.

FIG. 7 shows a representative hardware environment associated with a user device 616 and/or server 614 of FIG. 6, in accordance with one embodiment. FIG. 7 illustrates a typical hardware configuration of a processor system 700 having a central processing unit 710, such as a microprocessor, and a number of other units interconnected via a system bus 712, according to one embodiment. In some embodiments, central processing unit 710 may include any of the approaches described above with reference to the one or more processors 210 of FIG. 2.

The processor system 700 shown in FIG. 7 includes a Random Access Memory (RAM) 714, Read Only Memory (ROM) 716, and an I/O adapter 718. According to some embodiments, which are in no way intended to limit the invention, I/O adapter 718 may include any of the approaches described above with reference to I/O adapter 218 of FIG. 2. Referring still to processor system 700 of FIG. 7, the aforementioned components 714, 716, 718 may be used for connecting peripheral devices such as storage subsystem 720 to the bus 712. In some embodiments, storage subsystem 720 may include a similar and/or the same configuration as data storage system 220 of FIG. 2. According to an example, which is in no way intended to limit the invention, storage subsystem 720 may include non-volatile data storage cards, e.g., having NVRAM memory cards, RAM, ROM, and/or some other known type of non-volatile memory, in addition to RAID controllers as illustrated in FIG. 2.

With continued reference to FIG. 7, a user interface adapter 722 for connecting a keyboard 724, a mouse 726, a speaker 728, a microphone 732, and/or other user interface devices such as a touch screen, a digital camera (not shown), etc., to the bus 712.

Processor system 700 further includes a communication adapter 734 which connects the processor system 700 to a communication network 735 (e.g., a data processing network) and a display adapter 736 which connects the bus 712 to a display device 738.

The processor system 700 may have resident thereon an operating system of any known type. It will be appreciated that a preferred embodiment may also be implemented on platforms and operating systems other than those mentioned. A preferred embodiment may be written using JAVA®, XML, C, and/or C++ language, or other programming languages, along with an object oriented programming methodology. Object oriented programming (OOP), which has become increasingly used to develop complex applications, may be used.

Figure 8:
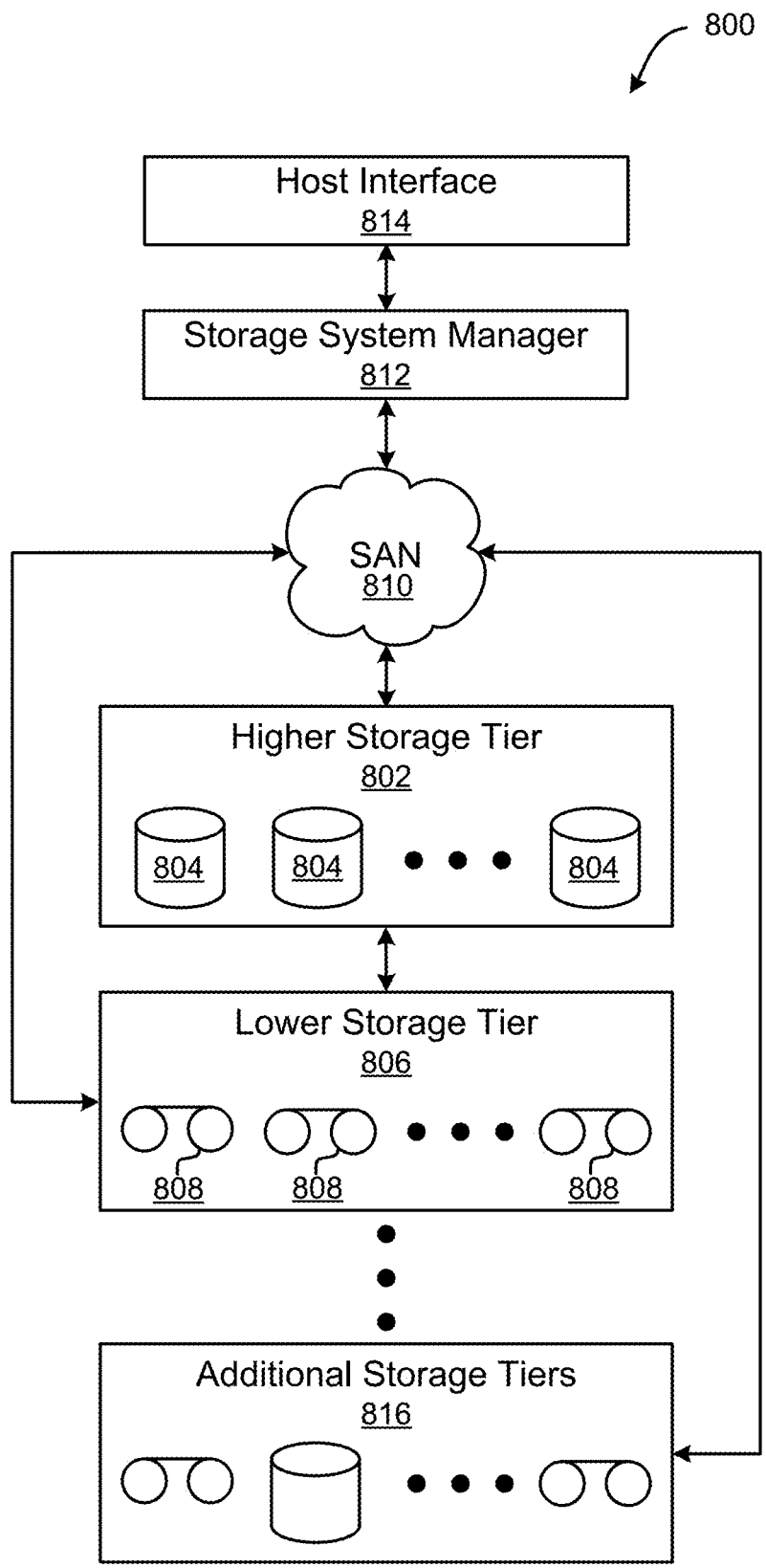
FIG. 8 is a tiered data storage system in accordance with one embodiment.

Moreover, FIG. 8 illustrates a storage system 800 which implements high level (e.g., SSD) storage tiers in combination with lower level (e.g., magnetic tape) storage tiers, according to one embodiment. Note that some of the elements shown in FIG. 8 may be implemented as hardware and/or software, according to various embodiments. The storage system 800 may include a storage system manager 812 for communicating with a plurality of media on at least one higher storage tier 802 and at least one lower storage tier 806. However, in other approaches, a storage system manager 812 may communicate with a plurality of media on at least one higher storage tier 802, but no lower storage tier. The higher storage tier(s) 802 preferably may include one or more random access and/or direct access media 804, such as hard disks, nonvolatile memory (NVM), NVRAM), solid state memory in SSDs, flash memory, SSD arrays, flash memory arrays, etc., and/or others noted herein or known in the art.

Referring still to FIG. 8, the lower storage tier(s) 806 preferably includes one or more lower performing storage media 808, including sequential access media such as magnetic tape in tape drives and/or optical media, slower accessing HDDs, slower accessing SSDs, etc., and/or others noted herein or known in the art. One or more additional storage tiers 816 may include any combination of storage memory media as desired by a designer of the system 800. Thus, the one or more additional storage tiers 816 may, in some approaches, include a SSD system architecture similar or the same as those illustrated in FIGS. 1-2. Also, any of the higher storage tiers 802 and/or the lower storage tiers 806 may include any combination of storage devices and/or storage media.

The storage system manager 812 may communicate with the storage media 804, 808 on the higher storage tier(s) 802 and lower storage tier(s) 806 through a network 810, such as a storage area network (SAN), as shown in FIG. 8, or some other suitable network type. The storage system manager 812 may also communicate with one or more host systems (not shown) through a host interface 814, which may or may not be a part of the storage system manager 812. The storage system manager 812 and/or any other component of the storage system 800 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 800 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 802, may include a majority of SSD storage media for storing data in a higher performing storage environment, and remaining storage tiers, including lower storage tier 806 and additional storage tiers 816 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 802, while data not having one of these attributes may be stored to the additional storage tiers 816, including lower storage tier 806. Of course, one of skill in the art, upon reading the present descriptions, may devise many other combinations of storage media types to implement into different storage schemes, according to the embodiments presented herein.

According to some embodiments, the storage system (such as 800) may include logic configured to receive a request to open a data set, logic configured to determine if the requested data set is stored to a lower storage tier 806 of a tiered data storage system 800 in multiple associated portions, logic configured to move each associated portion of the requested data set to a higher storage tier 802 of the tiered data storage system 800, and logic configured to assemble the requested data set on the higher storage tier 802 of the tiered data storage system 800 from the associated portions.

Of course, this logic may be implemented as a method on any device and/or system or as a computer program product, according to various embodiments.

What is claimed is:

1. A computer-implemented method, comprising:
receiving a sub-logical page read command for data stored in non-volatile random access memory (NVRAM) at a first logical block address, wherein the sub-logical page read command includes a hint and/or flag which indicates a redundant array of independent disks (RAID) controller is a source of the sub-logical page read command;
creating a searchable entry which includes the first logical block address;
receiving data read from the NVRAM, wherein the received data corresponds to a given logical block address;
in response to determining that the given logical block address matches the first logical block address of the searchable entry, storing a copy of the received data in a buffer;
receiving a sub-logical page write command for data stored in the NVRAM;
in response to determining that the sub-logical page write command is for data stored in the NVRAM at the first logical block address, coalescing the copy of the received data in the buffer with data included in the sub-logical page write command to form a full-logical page write; and
sending one or more instructions to perform the full-logical page write in the NVRAM.

2. The computer-implemented method of claim 1, wherein wherein the searchable entry is created in a portion of memory which only includes entries that correspond to read commands issued by the RAID controller.

3. The computer-implemented method of claim 1, wherein the searchable entry is a content-addressable memory (CAM) entry, wherein receiving a sub-logical page write command for data stored in the NVRAM includes:
determining whether the sub-logical page write command is for data stored in the NVRAM at a specified logical block address which matches a logical block address of any entry in the CAM.

4. The computer-implemented method of claim 3, comprising:
in response to determining that the sub-logical page write command is for data stored in the NVRAM at a specified logical block address which does not match the logical block address of any entry in the CAM, issuing a sub-logical page read command for data stored in NVRAM at the specified logical block address;
coalescing data read from NVRAM at the specified logical block address in the buffer with data included in the sub-logical page write command to form a full-logical page write; and
sending one or more instructions to perform the full-logical page write in the NVRAM.

5. The computer-implemented method of claim 1, wherein the searchable entry is a content-addressable memory (CAM) entry, wherein receiving data read from the NVRAM includes:
determining whether the given logical block address matches a logical block address of any entry in the CAM.

6. The computer-implemented method of claim 5, comprising:
in response to determining that the given logical block address does not match the logical block address of any entry in the CAM, releasing the data read from the NVRAM.

7. The computer-implemented method of claim 1, wherein the NVRAM is Flash memory.

8. The computer-implemented method of claim 7, wherein the NVRAM is NAND Flash memory.

9. A computer program product comprising a computer readable storage medium having program instructions embodied therewith, the program instructions readable and/or executable by a processor to cause the processor to:
receive, by the processor, a sub-logical page read command for data stored in non-volatile random access memory (NVRAM) at a first logical block address;
create, by the processor, a searchable entry which includes the first logical block address, wherein the searchable entry is created in a portion of memory which only includes entries that correspond to read commands issued by a redundant array of independent disks (RAID) controller;
receive, by the processor, data read from the NVRAM, wherein the received data corresponds to a given logical block address that matches a logical block address of an entry in the portion of memory;
in response to determining that the given logical block address matches the first logical block address of the searchable entry, store, by the processor, a copy of the received data in a buffer;
receive, by the processor, a sub-logical page write command for data stored in the NVRAM;
in response to determining that the sub-logical page write command is for data stored in the NVRAM at the first logical block address, coalesce, by the processor, the copy of the received data in the buffer with data included in the sub-logical page write command to form a full-logical page write; and send, by the processor, one or more instructions to perform the full-logical page write in the NVRAM.

10. The computer program product of claim 9, wherein the sub-logical page read command is received from a RAID controller.

11. The computer program product of claim 9, wherein the searchable entry is a content-addressable memory (CAM) entry, wherein receiving a sub-logical page write command for data stored in the NVRAM includes:
determining whether the sub-logical page write command is for data stored in the NVRAM at a specified logical block address which matches a logical block address of any entry in the CAM.

12. The computer program product of claim 11, wherein the program instructions are readable and/or executable by the processor to cause the processor to:
in response to determining that the sub-logical page write command is for data stored in the NVRAM at a specified logical block address which does not match the logical block address of any entry in the CAM, issue, by the processor, a sub-logical page read command for data stored in NVRAM at the specified logical block address;
coalesce, by the processor, data read from NVRAM at the specified logical block address in the buffer with data included in the sub-logical page write command to form a full-logical page write; and
send, by the processor, one or more instructions to perform the full-logical page write in the NVRAM.

13. The computer program product of claim 9, wherein the searchable entry is a content-addressable memory (CAM) entry, wherein receiving data read from the NVRAM includes:
determining whether the given logical block address matches a logical block address of any entry in the CAM.

14. The computer program product of claim 13, wherein the program instructions are readable and/or executable by the processor to cause the processor to:
in response to determining that the given logical block address does not match the logical block address of any entry in the CAM, release, by the processor, the data read from the NVRAM.

15. The computer program product of claim 9, wherein the NVRAM is Flash memory.

16. The computer program product of claim 15, wherein the NVRAM is NAND Flash memory.

17. A system, comprising:
a plurality of non-volatile random access memory (NVRAM) blocks configured to store data;
a processor; and
logic integrated with and/or executable by the processor, the logic being configured to:
receive, by the processor, a sub-logical page read command for data stored in the NVRAM at a first logical block address, wherein the sub-logical page read command includes a hint and/or flag which indicates a redundant array of independent disks (RAID) controller is a source of the sub-logical page read command;
create, by the processor, a searchable entry which includes the first logical block address, wherein the searchable entry is created in a portion of memory which only includes entries that correspond to read commands issued by the RAID controller;
receive, by the processor, data read from the NVRAM, wherein the received data corresponds to a given logical block address that matches a logical block address of an entry in the portion of memory;
in response to determining that the given logical block address matches the first logical block address of the searchable entry, store, by the processor, a copy of the received data in a buffer;
receive, by the processor, a sub-logical page write command for data stored in the NVRAM;
in response to determining that the sub-logical page write command is for data stored in the NVRAM at the first logical block address, coalesce, by the processor, the copy of the received data in the buffer with data included in the sub-logical page write command to form a full-logical page write; and
send, by the processor, one or more instructions to perform the full-logical page write in the NVRAM.

18. The system of claim 17, wherein the searchable entry is a content-addressable memory (CAM) entry, wherein the portion of memory is in a CAM, wherein the NVRAM is NAND Flash memory.

19. The system of claim 18, wherein receiving a sub-logical page write command for data stored in the NVRAM includes:
determining whether the sub-logical page write command is for data stored in the NVRAM at a specified logical block address which matches a logical block address of any entry in the CAM.

20. The system of claim 19, the logic being configured to:
in response to determining that the sub-logical page write command is for data stored in the NVRAM at a specified logical block address which does not match the logical block address of any entry in the CAM, issue, by the processor, a sub-logical page read command for data stored in NVRAM at the specified logical block address;
coalesce, by the processor, data read from NVRAM at the specified logical block address in the buffer with data included in the sub-logical page write command to form a full-logical page write; and
send, by the processor, one or more instructions to perform the full-logical page write in the NVRAM.

* * * * *